(12) United States Patent
Binette et al.

(10) Patent No.: US 8,507,599 B2
(45) Date of Patent: *Aug. 13, 2013

(54) GOLF BALL LAYERS BASED ON IONOMERS MADE WITH POLYALKENAMER CARRIERS

(75) Inventors: Mark L. Binette, Mattapoisett, MA (US); Brian Comeau, Berkley, MA (US); Douglas S. Goguen, New Bedford, MA (US); Robert Blink, Newport, RI (US); Michael J. Sullivan, Barrington, RI (US); David A. Bulpett, Boston, MA (US)

(73) Assignee: Acushnet Company, Fairhaven, MA (US)

( * ) Notice: Subject to any disclaimer, the term of this patent is extended or adjusted under 35 U.S.C. 154(b) by 238 days.

This patent is subject to a terminal disclaimer.

(21) Appl. No.: 12/972,785

(22) Filed: Dec. 20, 2010

(65) Prior Publication Data

US 2012/0157231 A1    Jun. 21, 2012

(51) Int. Cl.
| A63B 37/00 | (2006.01) |
| A63B 37/06 | (2006.01) |
| C08L 33/02 | (2006.01) |
| C08L 45/00 | (2006.01) |

(52) U.S. Cl.
USPC ........... 524/322; 524/394; 524/397; 524/398; 524/399; 524/400; 525/194; 525/196; 525/197; 525/201; 525/216; 525/221; 473/372; 473/373; 473/374; 473/376; 473/378; 473/385

(58) Field of Classification Search
None
See application file for complete search history.

(56) References Cited

U.S. PATENT DOCUMENTS

| 3,264,269 A | 8/1966 | Rees |
| 3,317,631 A | 5/1967 | Rees |
| 4,774,290 A | 9/1988 | Neill et al. |
| 4,847,164 A | 7/1989 | Neill et al. |
| 4,956,414 A | 9/1990 | Muehlenbernd et al. |
| 5,631,328 A | 5/1997 | Wang et al. |
| 5,837,779 A | 11/1998 | Current et al. |
| 6,290,611 B1 | 9/2001 | Rajagopalan et al. |
| 6,291,567 B1 * | 9/2001 | Nakaura et al. ............ 524/412 |
| 6,566,415 B2 | 5/2003 | Sullivan et al. |
| 6,756,436 B2 | 6/2004 | Rajagopalan et al. |
| 6,825,305 B2 | 11/2004 | Rajagopalan et al. |
| 7,160,954 B2 | 1/2007 | Zieske et al. |
| 7,312,267 B2 | 12/2007 | Kennedy, III et al. |
| 7,514,505 B2 | 4/2009 | Egashira et al. |
| 7,528,196 B2 | 5/2009 | Kim et al. |
| 7,642,319 B2 | 1/2010 | Sullivan |
| 7,645,836 B2 | 1/2010 | Walther et al. |
| 2001/0018375 A1 | 8/2001 | Hayashi et al. |
| 2001/0019971 A1 | 9/2001 | Hayashi et al. |
| 2003/0125480 A1 | 7/2003 | Sullivan et al. |
| 2009/0170633 A1 * | 7/2009 | Kim et al. ................. 473/371 |
| 2009/0191981 A1 | 7/2009 | Kim et al. |
| 2009/0203469 A1 | 8/2009 | Sullivan |
| 2009/0227394 A1 | 9/2009 | Bulpett et al. |
| 2010/0160079 A1 | 6/2010 | Kim et al. |
| 2010/0240468 A1 | 9/2010 | Rajagopalan et al. |
| 2012/0157230 A1 * | 6/2012 | Blink et al. ............... 473/371 |

FOREIGN PATENT DOCUMENTS

JP    05302277    * 11/1993

OTHER PUBLICATIONS

Evonik Industries, Vestenamer 8012 rubber with unique properties, Mar. 2009.
Struktol, Creanova—Vestenamer 8012, Oct. 12, 1999.

* cited by examiner

Primary Examiner — David Buttner
(74) Attorney, Agent, or Firm — Daniel W. Sullivan

(57) ABSTRACT

Golf balls containing a core having at least one layer and cover having at least one layer are provided. A thermoplastic ionomeric composition is used to form at least one layer of the ball. The composition is prepared by providing a masterbatch comprising cycloalkene (polyalkenamer) rubber and neutralizing agent and mixing the masterbatch with ethylene acid copolymer. The acid groups are neutralized to 30 weight percent or greater, preferably 50% or greater, and more preferably 70% or greater. The resulting ball has high resiliency and rebounding properties along with a soft feel.

17 Claims, 2 Drawing Sheets

GOLF BALL LAYERS BASED ON IONOMERS MADE WITH POLYALKENAMER CARRIERS

BACKGROUND OF THE INVENTION

1. Field of the Invention

The present invention generally relates to multi-piece golf balls having a solid core of at least one layer and cover of at least one layer. A thermoplastic ionomeric composition is used to form at least one of the ball components. The composition is prepared by providing a masterbatch comprising cycloalkene (polyalkenamer) rubber and neutralizing agent and mixing the masterbatch with ethylene acid copolymer. The resulting ball has high resiliency and rebounding properties along with a soft feel.

2. Brief Review of the Related Art

Manufacturers of golf balls are constantly looking at new materials for developing multi-piece, solid balls that can be used by recreational and professional golfers. Basically, a two-piece solid golf ball includes a solid inner core protected by an outer cover. The inner core is made commonly of a rubber material such as natural and synthetic rubbers, styrene butadiene, polybutadiene, poly(cis-isoprene), poly(trans-isoprene), or highly neutralized acid copolymers. The outer cover is made commonly of ionomer resins, polyamides, polyesters, polyurethanes, or polyureas. The resiliency and rebounding performance of the golf ball is based primarily on the core of the ball. The core acts as an "engine" for the ball. In general, the rebounding performance of the ball is based on its initial velocity after being struck by the face of the golf club and its outgoing velocity after making impact with a hard surface. More particularly, the "coefficient of restitution" or "COR" of a golf ball refers to the ratio of a ball's rebound velocity to its initial incoming velocity when the ball is fired out of an air cannon into a rigid vertical plate. The COR for a golf ball is written as a decimal value between zero and one. A golf ball may have different COR values at different initial velocities. The United States Golf Association (USGA) sets limits on the initial velocity of the ball so one objective of golf ball manufacturers is to maximize COR under these conditions. Balls with a higher rebound velocity have a higher COR value. Such golf balls rebound faster, retain more total energy when struck with a club, and have longer flight distance.

Other multi-piece golf balls are known in the industry. For example, a four-piece solid golf ball having an inner core and surrounding outer core layer (dual-core) with an intermediate layer and outer cover may be made. Five-piece balls having a dual-core, surrounding intermediate layer, and multi-layer cover comprising an inner cover and outer cover also are known. Different materials can be used to impart specific properties and features to the balls.

The patent literature describes various golf balls having multi-layer core constructions. For example, Sullivan et al., U.S. Pat. No. 7,722,482 discloses a golf ball having a multi-layer core and cover. The multi-layer core consists of a center and an outer core layer that are both soft relative to a hard intermediate core layer. The outer core layer is thin relative to the center and the outer core layer. Sullivan et al., U.S. Pat. No. 6,852,044 discloses golf balls having multi-layered cores including a relatively soft, low compression inner core surrounded by a relatively rigid outer core. Ohsumi et al., U.S. Pat. No. 5,772,531 discloses a solid golf ball including a solid core having a three-layered structure composed of an inner layer, an intermediate layer, and an outer layer. The intermediate layer is designed to have a JIS-C hardness of 50 to 80, and the outer layer is designed to have a hardness which is higher than the hardness of the intermediate layer.

It is also know that cycloalkene (polyalkenamer) rubber compositions can be used to form the core. For example, Kim et al., U.S. Pat. No. 7,528,196 and U.S. Patent Application Publication US 2009/0191981 disclose a golf ball comprising a core, cover layer, and optionally one or more inner cover layers, wherein at least one portion of the ball comprises a blend of a polyalkenamer and polyamide. The polyalkenamer/polyamide composition contains about 2 to about 90 weight % of a polyalkenamer polymer and about 10 to about 98 weight % of a polyamide. The '196 patent and '981 Published Application further disclose that the polyalkenamer/polyamide composition may be blended with other polymers including rubbers such as polybutadiene, polyisoprene, polychloroprene, polybutylene, and styrene-butadiene rubber and ionomers.

Ionomeric materials have long been used as layers of golf balls, particularly as inner or outer cover layers. In general, ionomers refer to copolymers of α-olefin; $C_3$ to $C_8$ α, β-ethylenically unsaturated mono- or dicarboxylic acid; and optional softening monomer. Typically, the α-olefin is ethylene or $C_3$ to $C_8$ and the vinyl comonomer has acid group such as methacrylic, acrylic acid, or maleic acid. These ionomers may be prepared by methods known in the art. These ionomer acid copolymers contain inter-chain ionic bonding. Metal ions such as sodium, lithium, zinc, and magnesium are used to neutralize the acid groups in the copolymer. Commercially available olefin-based ionomer resins are available in various grades and identified based on the type of base resin, molecular weight, and type of metal ion, amount of acid, degree of neutralization, additives, and other properties. Ionomers have excellent toughness, crack resistance, resilience, and hardness which make them ideally suited for these types of layers.

Most ionomers suitable for conventional golf ball layers have a percent neutralization of from 19 wt % to 69 wt %. Neutralization helps cause cross-linking to occur and this ionic cross-linking helps impart desirable properties to the material such as durability and hardness. However, as the level of neutralization increases, the viscosity of the ionomer resin increases and this makes it difficult to mold the material into covers for the ball. Thus, although the properties of the highly neutralized ionomer resins may be advantageous, the melt processability of such resins is generally poor. Neutralization to 90% and higher is known but at these levels, the material has a very low melt flow and may even be intractable. As a result, high levels of metal cation-fatty acid flow modifiers often need to be added to such resins. For example, Statz et al., U.S. Pat. No. 6,777,472 generally describes a process for modification of highly-neutralized ionomers by the addition of a sufficient amount of specific organic fatty acids (or metal salts thereof) in order to maintain melt-processability. Rajagopalan et al., U.S. Pat. No. 6,756,436 discloses a golf ball containing a core made of a polymer containing an acid group neutralized by an organic acid or a salt thereof, the organic acid or salt thereof being present in an amount sufficient to neutralize the polymer by at least about 80%.

Bulpett et al, U.S. Patent Application Publication US 2009/0227394 discloses that ionomer resins may be a useful material for making a thermoplastic intermediate core layer in a multi-layer core having a thermoset inner core layer (center) and thermoset rubber outer core layer. When ionomeric resins are modified to relatively high levels (greater than 75%), the ionomers show reduced melt flow and improved heat resistance making them useful material for such intermediate core layers. However, there may be problems with adding metal oxides or other neutralizing agents to ethylene acid copolymers to provide high levels of neutralization. For example, the process normally involves directly adding caustic powders and/or liquids to the ethylene acid copolymer via a twin screw extruder which can be difficult, messy, and dangerous.

In another method, Neill et al., U.S. Pat. Nos. 4,666,988 and 4,774,290 disclose a process for forming melt-reacted blends of ethylene/carboxylic acid copolymers with metal oxides are improved by first incorporating the metal oxide into an ethylene acid copolymer of low density polyethylene (LDPE), high density polyethylene (HDPE), or linear low density polyethylene (LLDPE) to form a concentrate or masterbatch, then melt-blending a minor amount of the concentrate into the ethylene acid copolymer.

It would be desirable to develop a new method for introducing neutralizing agents into molten ethylene acid copolymers that can be done neatly, safely, and with greater control. Another objective of the present invention is to develop compositions that can be used to make cores and covers for a golf ball, wherein the core provides the ball with high resiliency along with a comfortable and soft feel. Yet another goal involves preparing a thermoplastic ionomeric composition having good durability and strength, that could be used in packaging, surface coatings, and other applications. The present invention provides such methods, components for golf balls, and compositions having such properties as well as other advantageous characteristics, features, and benefits.

SUMMARY OF THE INVENTION

The present invention provides a multi-piece golf ball comprising a solid core having at least one layer and a cover having at least one layer. The golf ball may have different constructions. For instance, in one version, a golf ball having a dual-core is made; while in another version, a golf ball having a three-layered core is made. A thermoplastic ionomeric composition containing acid groups neutralized to 30 wt. % or greater is used to form at least one of the core or cover layers. Preferably, the composition contains acid groups neutralized to 50% or greater, more preferably 70% or greater, and most preferably 90% or greater. The ionomeric composition comprises: i) cycloalkene (polyalkenamer) rubber; ii) ionomeric resin; and iii) neutralizing agent. A masterbatch comprising the cycloalkene rubber and neutralizing agent is mixed with an ethylene acid copolymer to prepare the composition. The polyalkenamer rubber preferably has a trans-content of about 55% or greater and a melting point of 30° C. or greater, more preferably 75% or greater and a melting point of 50° C. or greater.

In one embodiment, the ethylene acid copolymer is partially neutralized prior to adding the masterbatch containing the cycloalkene rubber and neutralizing agent to the acid copolymer. That is, the masterbatch may be added to an ionomer containing some neutralized acid groups. For example, the masterbatch may be added and mixed with a partially neutralized ethylene acid copolymer (partially neutralized ionomer) containing acid groups neutralized to 10% or greater so the final ionomeric composition contains acid groups neutralized to 40% or greater. In another version, the starting ethylene acid copolymer may contain acid groups neutralized to 30% or greater; the masterbatch is added and mixed with the acid copolymer so the final ionomeric composition contains acid groups neutralized to 60% or greater.

The masterbatch preferably contains at least 10% by weight neutralizing agents, more preferably 25%, and most preferably 50%. Different materials can be used as the neutralizing agent. For example, the neutralizing agent can be a metal cation salt, wherein the metal cation is selected preferably from Zn, Na, Li, K, Ca, Mg, Ni, Mn, Cu, Ti, and Al, and mixtures thereof. The ionomer composition may further contain additives such as, for example, polyethylene glycol, waxes, bis-stearamide, minerals, and phthalate compounds. Fillers such as tungsten, zinc oxide, barium sulfate, silica, calcium carbonate, and zinc carbonate can be included in the composition. The ionomer composition may further contain stiffening agents. In addition, the composition may contain a fatty acid or salt thereof. The fatty acid is selected preferably from the group of stearic acid, behenic acid, erucic acid, oleic acid, linoelic acid, and dimerized derivatives, and mixtures thereof. In one version, the fatty acid or salt is added to the masterbatch prior to mixing the masterbatch with the ethylene acid copolymer. In another version, the fatty acid or salt is added after the masterbatch and ethylene acid copolymer have been mixed. Amine-based or pyridine-based compounds also may be used as the neutralizing agents. The invention also encompasses methods for preparing the multi-piece golf ball.

In another embodiment, a thermoplastic ionomeric composition containing acid groups neutralized to 30 wt. % or greater and comprising: i) cycloalkene (polyalkenamer) rubber; ii) ionomeric resin; and iii) neutralizing agent may be prepared. To prepare the composition, a masterbatch comprising the cycloalkene rubber and neutralizing agent is mixed with an ethylene acid copolymer to prepare the composition. The composition may be used in many different applications including, but not limited to, packaging, surface coatings, and other protective materials where good durability and impact-resistance is needed.

The invention also relates to methods of preparing multi-piece golf balls having core and cover components, comprising the steps of: a) preparing a masterbatch comprising cycloalkene rubber and neutralizing agent; b) mixing the masterbatch with ethylene acid copolymer, wherein the acid groups are neutralized to 30 wt. or greater; and c) forming the composition into at least one component of a multi-piece golf ball. For example, the final ionomeric composition may be molded into a core or cover layer component of the golf ball.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

Figure 1:
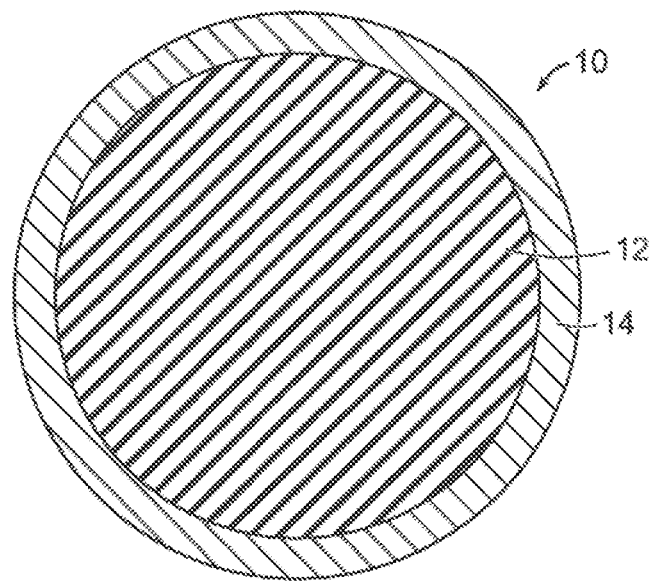
FIG. 1 is a cross-sectional view of a two-piece golf ball having an inner core made of a polyalkenamer rubber/ionomer composition and a cover layer made in accordance with the present invention.

The present invention relates generally to golf balls containing at least one component made from a thermoplastic ionomeric composition. The composition is prepared by providing a masterbatch comprising cycloalkene (polyalkenamer) rubber and neutralizing agent and mixing the masterbatch with ethylene acid copolymer. The invention also encompasses methods for making such golf balls.

Golf balls having various constructions may be made in accordance with this invention. For example, golf balls having two-piece, three-piece, four-piece, and five-piece constructions with single or multi-layered cores and cover materials may be made The term, "layer" as used herein means generally any spherical portion of the golf ball. More particularly, in one version, a three-piece golf ball having a solid center (otherwise referred to as an inner core) and a multi-layered cover (having an inner cover layer and outer cover layer) is made. In another version, a four-piece golf ball comprising a dual-core having an inner core and a surrounding outer core layer and a multi-layered cover is made. In yet another construction, a five-piece golf ball having a dual-core, intermediate layer, and multi-layered cover is made. The diameter and thickness of the different layers along with properties such as hardness and compression may vary depending upon the construction and desired playing performance properties of the golf ball. The core may contain sections having substantially the same hardness or different hardness levels. That is, there can be substantially uniform hardness throughout the different sections of the core or there can be hardness gradients as discussed in further detail below.

The golf ball may include a single or multi-layered core made of a rubber composition. In general, suitable rubber compositions comprise a base rubber, an initiator agent, a co-agent, and optionally one or more of a zinc oxide, zinc stearate or stearic acid, antioxidant, and a soft-and-fast agent. Suitable base rubbers include natural and synthetic rubbers including, but not limited to, polybutadiene, polyisoprene, ethylene propylene rubber ("EPR"), styrene-butadiene rubber, styrenic block copolymer rubbers (such as "SI", "SIS", "SB", "SBS", "SIBS", and the like, where "S" is styrene, "I" is isobutylene, and "B" is butadiene), butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof. Diene rubbers are preferred, particularly polybutadiene, styrene-butadiene, and mixtures of polybutadiene with other elastomers wherein the amount of polybutadiene present is at least 40 wt % based on the total polymeric weight of the mixture. Particularly preferred polybutadienes include high-cis neodymium-catalyzed polybutadienes and cobalt-, nickel-, or lithium-catalyzed polybutadienes. Suitable examples of commercially-available polybutadienes include, but are not limited to, BUNA CB high-cis neodymium-catalyzed polybutadiene rubbers, such as BUNA CB 23, and TAKTENE high-cis cobalt-catalyzed polybutadiene rubbers, such as TAKTENE 220 and 221 from Lanxess Corp.; SE BR-1220 from Dow Chemical Company; EUROPRENE NEOCIS BR 40 and BR 60 from Polimeri Europa; UBEPOL-BR rubbers from UBE Industries, Inc.; BR 01 from Japan Synthetic Rubber Co., Ltd.; and NEODENE high-cis neodymium-catalyzed polybutadiene rubbers, such as NEODENE BR 40 from Karbochem. Other suitable base rubbers include cycloalkene (polyalkenamer) rubbers as described in further detail below. Examples of suitable polyalkenamer rubbers are polypentenamer rubber, polyheptenamer rubber, polyoctenamer rubber, polydecenamer rubber and polydodecenamer rubber. Polyoctenamer rubbers are commercially available from Evonik Degussa GmbH of Marl, Germany and sold under the VESTENAMER tradename.

In one embodiment, a masterbatch comprising polyalkenamer rubber and neutralizing agent may be mixed with an ethylene acid copolymer to form a thermoplastic ionomeric composition as discussed in further detail below, and this composition may be used to form the core. If such an ionomeric composition is used, it preferably is used in the outer core layer of a multi-layered core construction as described further below.

Suitable initiator agents include organic peroxides, high energy radiation sources capable of generating free radicals, and combinations thereof. High energy radiation sources capable of generating free radicals include, but are not limited to, electron beams, ultra-violet radiation, gamma radiation, X-ray radiation, infrared radiation, heat, and combinations thereof.

Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; lauryl peroxide; benzoyl peroxide; and combinations thereof. Examples of suitable commercially-available peroxides include, but are not limited to PERKADOX BC dicumyl peroxide from Akzo Nobel, and VAROX peroxides, such as VAROX ANS benzoyl peroxide and VAROX 231 1,1-di(t-butylperoxy)3,3,5-trimethylcyclohexane from RT Vanderbilt Company, Inc. Peroxide initiator agents are generally present in the rubber composition in an amount of at least 0.05 parts by weight per 100 parts of the base rubber, or an amount within the range having a lower limit of 0.05 parts or 0.1 parts or 0.8 parts or 1 part or 1.25 parts or 1.5 parts by weight per 100 parts of the base rubber, and an upper limit of 2.5 parts or 3 parts or 5 parts or 6 parts or 10 parts or 15 parts by weight per 100 parts of the base rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

Co-agents are commonly used with peroxides to increase the state of cure. Suitable co-agents include, but are not limited to, metal salts of unsaturated carboxylic acids; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, nickel, and sodium. In a particular embodiment, the co-agent is selected from zinc salts of acrylates, diacrylates, methacrylates, dimethacrylates, and mixtures thereof. In another particular embodiment, the co-agent is zinc diacrylate. When the co-agent is zinc diacrylate (ZDA) and/or zinc dimethacrylate, the co-agent is typically included in the rubber composition in an amount within the range having a lower limit of 1 or 5 or 10 or 15 or 19 or 20 parts by weight per 100 parts of the base rubber, and an upper limit of 24 or 25 or 30 or 35 or 40 or 45 or 50 or 60 parts by weight per 100 parts of the base rubber. When one or more less active co-agents are used, such as zinc monomethacrylate and various liquid acrylates and methacrylates, the amount of less active co-agent used may be the same as or higher than for zinc diacrylate and zinc dimethacrylate co-agents. The desired compression may be obtained by adjusting the amount of cross-linking, which can be achieved, for example, by altering the type and amount of co-agent.

The rubber composition optionally includes a curing agent. Suitable curing agents include, but are not limited to, sulfur; N-oxydiethylene 2-benzothiazole sulfenamide; N,N-di-ortho-tolylguanidine; bismuth dimethyldithiocarbamate; N-cyclohexyl 2-benzothiazole sulfenamide; N,N-diphenylguanidine; 4-morpholinyl-2-benzothiazole disulfide; dipentamethylenethiuram hexasulfide; thiuram disulfides; mercaptobenzothiazoles; sulfenamides; dithiocarbamates; thiuram sulfides; guanidines; thioureas; xanthates; dithiophosphates; aldehyde-amines; dibenzothiazyl disulfide; tetraethylthiuram disulfide; tetrabutylthiuram disulfide; and combinations thereof.

In addition, the rubber composition optionally contains one or more antioxidants. Antioxidants are compounds that can inhibit or prevent the oxidative degradation of the rubber. Some antioxidants also act as free radical scavengers; thus, when antioxidants are included in the rubber composition, the amount of initiator agent used may be as high as or higher than the amounts disclosed herein. Suitable antioxidants include, for example, dihydroquinoline antioxidants, amine type antioxidants, and phenolic type antioxidants.

Furthermore, the rubber composition may contain one or more fillers to adjust the density and/or specific gravity of the core. Exemplary fillers include precipitated hydrated silica, clay, talc, asbestos, glass fibers, aramid fibers, mica, calcium metasilicate, zinc sulfate, barium sulfate, zinc sulfide, lithopone, silicates, silicon carbide, diatomaceous earth, polyvinyl chloride, carbonates (e.g., calcium carbonate, zinc carbonate, barium carbonate, and magnesium carbonate), metals (e.g., titanium, tungsten, aluminum, bismuth, nickel, molybdenum, iron, lead, copper, boron, cobalt, beryllium, zinc, and tin), metal alloys (e.g., steel, brass, bronze, boron carbide whiskers, and tungsten carbide whiskers), oxides (e.g., zinc oxide, tin oxide, iron oxide, calcium oxide, aluminum oxide, titanium dioxide, magnesium oxide, and zirconium oxide), particulate carbonaceous materials (e.g., graphite, carbon black, cotton flock, natural bitumen, cellulose flock, and leather fiber), microballoons (e.g., glass and ceramic), fly ash, regrind (i.e., core material that is ground and recycled), nano-fillers and combinations thereof. The amount of particulate material(s) present in the rubber composition is typically within a range having a lower limit of 5 parts or 10 parts by weight per 100 parts of the base rubber, and an upper limit of 30 parts or 50 parts or 100 parts by weight per 100 parts of the base rubber. Filler materials may be dual-functional fillers, such as zinc oxide (which may be used as a filler/acid scavenger) and titanium dioxide (which may be used as a filler/brightener material).

The rubber composition may also contain one or more additives selected from processing aids, processing oils, plasticizers, coloring agents, fluorescent agents, chemical blowing and foaming agents, defoaming agents, stabilizers, softening agents, impact modifiers, free radical scavengers, accelerators, scorch retarders, and the like. The amount of additive(s) present in the rubber composition is typically within a range having a lower limit of 0 parts by weight per 100 parts of the base rubber, and an upper limit of 20 parts or 50 parts or 100 parts or 150 parts by weight per 100 parts of the base rubber.

A soft-and-fast agent also may be included in the rubber composition. Preferably, the rubber composition contains from 0.05 phr to 10.0 phr of a soft-and-fast agent. In one embodiment, the soft-and-fast agent is present in an amount within a range having a lower limit of 0.05 or 0.1 or 0.2 or 0.5 phr and an upper limit of 1.0 or 2.0 or 3.0 or 5.0 phr. In another embodiment, the soft-and-fast agent is present in an amount of from 2.0 phr to 5.0 phr, or from 2.35 phr to 4.0 phr, or from 2.35 phr to 3.0 phr. In an alternative high concentration embodiment, the soft-and-fast agent is present in an amount of from 5.0 phr to 10.0 phr, or from 6.0 phr to 9.0 phr, or from 7.0 phr to 8.0 phr. In another embodiment, the soft-and-fast agent is present in an amount of 2.6 phr. Suitable soft-and-fast agents include, but are not limited to, organosulfur and metal-containing organosulfur compounds; organic sulfur compounds, including mono, di, and polysulfides, thiol, and mercapto compounds; inorganic sulfide compounds; blends of an organosulfur compound and an inorganic sulfide compound; Group VIA compounds; substituted and unsubstituted aromatic organic compounds that do not contain sulfur or metal; aromatic organometallic compounds; hydroquinones; benzoquinones; quinhydrones; catechols; resorcinols; and combinations thereof. As used herein, "organosulfur compound" refers to any compound containing carbon, hydrogen, and sulfur, where the sulfur is directly bonded to at least 1 carbon. As used herein, the term "sulfur compound" means a compound that is elemental sulfur, polymeric sulfur, or a combination thereof. It should be further understood that the term "elemental sulfur" refers to the ring structure of $S_8$ and that "polymeric sulfur" is a structure including at least one additional sulfur relative to elemental sulfur.

When the rubber composition includes one or more hydroquinones, benzoquinones, quinhydrones, catechols, resorcinols, or a combination thereof, the total amount of hydroquinone(s), benzoquinone(s), quinhydrone(s), catechol(s), and/or resorcinol(s) present in the composition is typically at least 0.1 parts by weight or at least 0.15 parts by weight or at least 0.2 parts by weight per 100 parts of the base rubber, or an amount within the range having a lower limit of 0.1 parts or 0.15 parts or 0.25 parts or 0.3 parts or 0.375 parts by weight per 100 parts of the base rubber, and an upper limit of 0.5 parts or 1 part or 1.5 parts or 2 parts or 3 parts by weight per 100 parts of the base rubber. In a particularly preferred embodiment, the soft-and-fast agent is selected from zinc pentachlorothiophenol, pentachlorothiophenol, ditolyl disulfide, diphenyl disulfide, dixylyl disulfide, 2-nitroresorcinol, and combinations thereof.

The core, particularly an outer core layer in a dual-core construction, may further comprise from 1 to 100 phr of a stiffening agent. Preferably, if present, the stiffening agent is present in the outer core layer composition and not the inner core layer composition. Suitable stiffening agents include, but are not limited to, ionomers, acid copolymers and terpolymers, polyamides, and polyesters. A transpolyisoprene (for example, TP-301 transpolyisoprene from Kuraray) or transbutadiene rubber may also be added to increase stiffness to a core layer and/or improve cold-forming properties, which may improve processability by making it easier to mold outer core layer half-shells during the golf ball manufacturing process. When included in a core layer composition, the stiffening agent is preferably present in an amount of from 5 to 10 pph.

In one embodiment, the specific gravity of one or more of the core layers is increased. Suitable fillers for increasing specific gravity include, but are not limited to, metal and metal alloy powders, including, but not limited to, bismuth powder, boron powder, brass powder, bronze powder, cobalt powder, copper powder, nickel-chromium iron metal powder, iron metal powder, molybdenum powder, nickel powder, stainless steel powder, titanium metal powder zirconium oxide powder, tungsten metal powder, beryllium metal powder, zinc metal powder, and tin metal powder; metal flakes, including, but not limited to, aluminum flakes; metal oxides, including, but not limited to, zinc oxide, iron oxide, aluminum oxide, titanium dioxide, magnesium oxide, zirconium oxide, and tungsten trioxide; metal stearates; particulate carbonaceous materials including, but not limited to, graphite and carbon black; and nanoparticulates and hybrid organic/inorganic materials. Particularly suitable density-increasing fillers include, but are not limited to, tungsten, tungsten oxide, tungsten metal powder, zinc oxide, barium sulfate, and titanium dioxide.

In another embodiment, the specific gravity of one or more of the core layers is reduced. The specific gravity of a layer can be reduced by incorporating cellular resins, low specific gravity fillers, fibers, flakes, or spheres, or hollow microspheres or balloons, such as glass bubbles or ceramic zeospheres, in the polymeric matrix. The specific gravity of a layer can also be reduced by foaming. Typical physical foaming/blowing agents include volatile liquids such as freons, other halogenated hydrocarbons, water, aliphatic hydrocarbons, gases, and solid blowing agents, i.e., compounds that liberate gas as a result of desorption of gas. Typical chemical foaming/blowing agents include inorganic agents, such as ammonium carbonate and carbonates of alkali metals, and organic agents, such as azo and diazo compounds.

The specific gravity of each of the core layers is from 0.50 g/cm$^3$ to 5.00 g/cm$^3$. Core layers having an increased specific gravity preferably have a specific gravity of 1.15 g/cm$^3$ or greater, or 1.20 g/cm$^3$ or greater, or 1.25 g/cm$^3$ or greater, or 1.30 g/cm$^3$ or greater, or 1.35 g/cm$^3$ or greater, or 1.40 g/cm$^3$ or greater, or 1.50 g/cm$^3$ or greater. Core layers having a reduced specific gravity preferably have a specific gravity of 1.05 g/cm$^3$ or less, or 0.95 g/cm$^3$ or less, or 0.90 g/cm$^3$ or less, or 0.85 g/cm$^3$ or less. In a particular embodiment, the specific gravity of the center is 1.25 g/cm$^3$ or greater, or greater than 1.25 g/cm$^3$, or 1.30 g/cm$^3$ or greater; the specific gravity of the intermediate layer is 1.00 g/cc or less, or 0.95 g/cm$^3$ or less, or from 0.90 g/cm$^3$ to 1.00 g/cm$^3$; and the specific gravity of the outer core layer is 0.95 g/cm$^3$ or less or 0.90 g/cm$^3$ or less. In a particular aspect of this embodiment, the specific gravity of the outer core layer is less than the specific gravity of the intermediate layer. In another particular aspect of this embodiment, the center is formed from a composition wherein the specific gravity has been increased, preferably with a tungsten filler; the intermediate core layer is formed from a composition wherein the specific gravity has not been modified; and the outer core layer is formed from a composition wherein the specific gravity has been reduced. The weight distribution of cores disclosed herein can be varied to achieve certain desired parameters, such as spin rate, compression, and initial velocity.

Ethylene Acid Copolymers

Suitable ethylene acid copolymers that may be used to form the compositions of this invention are generally referred to as copolymers of ethylene; $C_3$ to $C_8$ α, β-ethylenically unsaturated mono- or dicarboxylic acid; and optional softening monomer. Copolymers may include, without limitation, ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl(meth)acrylate, ethylene/(meth)acrylic acid/methyl(meth)acrylate, ethylene/(meth)acrylic acid/ethyl (meth)acrylate terpolymers, and the like. The team, "copolymer," as used herein, includes polymers having two types of monomers, those having three types of monomers, and those having more than three types of monomers. Preferred α, β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth)acrylate" means methacrylate and/or acrylate.

When a softening monomer is included, such copolymers are referred to herein as E/X/Y-type copolymers, wherein E is ethylene; X is a $C_3$ to $C_8$ α, β-ethylenically unsaturated mono- or dicarboxylic acid; and Y is a softening monomer. The softening monomer is typically an alkyl (meth)acrylate, wherein the alkyl groups have from 1 to 8 carbon atoms. Preferred E/X/Y-type copolymers are those wherein X is (meth) acrylic acid and/or Y is selected from (meth)acrylate, n-butyl(meth)acrylate, isobutyl(meth)acrylate, methyl(meth) acrylate, and ethyl(meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ α, β-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 10 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer. "Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

Masterbatch

The composition of this invention is prepared by providing a masterbatch comprising cycloalkene (polyalkenamer) rubber and neutralizing agent and mixing the masterbatch with ethylene acid copolymer. The acidic groups in the ethylene acid copolymer are partially or totally neutralized with the neutralizing agent (cation source) from the masterbatch. Suitable cation sources include metal cations and salts thereof, organic amine compounds, ammonium, and combinations thereof. Preferred cation sources are metal cations and salts thereof, wherein the metal is preferably lithium, sodium, potassium, magnesium, calcium, barium, lead, tin, zinc, aluminum, manganese, nickel, chromium, copper, or a combination thereof. The metal cation salts provide the cations capable of neutralizing (at varying levels) the carboxylic acids of the ethylene acid copolymer and fatty acids, if present, as discussed further below. These include, for example, the sulfate, carbonate, acetate, oxide, or hydroxide salts of lithium, sodium, potassium, magnesium, calcium, barium, lead, tin, zinc, aluminum, manganese, nickel, chromium, copper, or a combination thereof. In one preferred embodiment, a high acid ethylene acid copolymer containing about 19 to 20 wt. % methacrylic or acrylic acid is neutralized with a polyalkenamer rubber master batch containing zinc and sodium cations, as discussed further below, to a 95% neutralization level. The amount of cation used in the composition is readily determined based on desired level of neutralization. As discussed above, the acid groups are neutralized to 10% or greater, normally 30% or greater, preferably 70 to 100%, more preferably 90 to 100%, and most preferably 95 to 100%. In another embodiment, an excess amount of neutralizing agent, that is, an amount greater than the stoichiometric amount needed to neutralize the acid groups, may be used. That is, the acid groups may be neutralized to 100% or greater, for example 110% or 120% or greater.

In yet another embodiment, the ethylene acid copolymer is partially neutralized prior to adding the masterbatch containing the cycloalkene rubber and neutralizing agent to the acid copolymer. That is, the masterbatch may be added to an ionomer containing some neutralized acid groups. For example, the masterbatch may be added and mixed with a partially neutralized ethylene acid copolymer (partially neutralized ionomer) containing acid groups neutralized to 10% or greater so the final ionomeric composition contains acid groups neutralized to 40% or greater. In another version, the starting ethylene acid copolymer may contain acid groups neutralized to 30% or greater; the masterbatch is added and mixed with the acid copolymer so the final ionomeric composition contains acid groups neutralized to 60% or greater.

When aluminum is used as the cation source, it is preferably used at low levels with another cation such as zinc, sodium, or lithium, since aluminum has a dramatic effect on melt flow reduction and cannot be used alone at high levels. For example, aluminum is used to neutralize about 10% of the acid groups and sodium is added to neutralize and additional 85% of the acid groups. High surface area cations such as micro and nano-scale cations are preferred.

In the present invention, it is not necessary that any "ionic plasticizer" such as organic acids or salts of organic acids, particularly fatty acids, be added to the ionomer resin. Such ionic plasticizers are used to make conventional ionomer composition more processable as described in Rajagopalan et al., U.S. Pat. No. 6,756,436, the disclosure of which is hereby incorporated by reference. In the present invention such ionic plasticizers are optional. In one preferred embodiment, a thermoplastic ionomer composition is made by neutralizing about 70 wt % or more of the acid groups without the use of any ionic plasticizer. On the other hand, in some instances, it may be desirable to add a small amount of ionic plasticizer, provided that it does not adversely affect the heat-resistance properties of the composition. For example, the ionic plasticizer may be added in an amount of 0.5 to 10 pph, more preferably 1 to 5 pph. The organic acids may be aliphatic, mono- or multi-functional (saturated, unsaturated, or multi-unsaturated) organic acids. Salts of these organic acids may also be employed. Suitable fatty acid salts include, for example, metal stearates, laureates, oleates, palmitates, pelargonates, and the like. For example, fatty acid salts such as zinc stearate, calcium stearate, magnesium stearate, barium stearate, and the like can be used. The salts of fatty acids are generally fatty acids neutralized with metal ions. The metal cation salts provide the cations capable of neutralizing (at varying levels) the carboxylic acid groups of the fatty acids. Examples include the sulfate, carbonate, acetate and hydroxide salts of metals such as barium, lithium, sodium, zinc, bismuth, chromium, cobalt, copper, potassium, strontium, titanium, tungsten, magnesium, cesium, iron, nickel, silver, aluminum, tin, or calcium, and blends thereof. It is preferred the organic acids and salts be relatively non-migratory (they do not bloom to the surface of the polymer under ambient temperatures) and non-volatile (they do not volatilize at temperatures required for melt-blending).

The masterbatch comprising the neutralizing agent in the polyalkenamer rubber material, which is described in further detail further below, is prepared by mixing the neutralizing agent and polyalkenamer rubber at a temperature in which the polyalkenamer is molten or any other suitable method. It is important the neutralizing agent is dispersed uniformly in the polyalkenamer rubber. When it is desirable to add a fatty acid or salt of a fatty acid, this may be done by melt-blending the polyalkenamer rubber and fatty acid or salt thereof, and adding a sufficient amount of a cation source. The masterbatch is then melt-blended with the ionomer polymer to form a uniform blend. The amount of cation source should be sufficient to increase the level of neutralization of all the acid moieties (including those in the acid copolymer and in the fatty acid) to 30% or greater, preferably 50% or greater, more preferably 70% or greater, and most preferably 90% or greater. Typically, the cation source makes up about 10 to about 99 weight % of the masterbatch, preferably 15 to 90%, and more preferably 25 to 50%.

Polyalkenamer Rubber

Suitable cycloalkene (polyalkenamer) rubbers that can be used in the compositions of this invention are rubbery polymers made from one or more cycloalkenes having from 5 to 20, preferably 5 to 15, ring carbon atoms. The cycloalkene rubbers (also referred to as polyalkenylene or polyalkenamer rubbers) may be prepared by ring opening metathesis polymerization of one or more cycloalkenes in the presence of organometallic catalysts as is known in the art. Such polymerization methods are disclosed, for example, in U.S. Pat. Nos. 3,492,245 and 3,804,803, the disclosures of which are hereby incorporated by reference. By the term, "cycloalkene rubber" as used herein, it is meant a compound having at least 20 weight % macrocycles (cyclic content). The cyclic and linear portions of the cycloalkene rubber have the following general chemical structures:

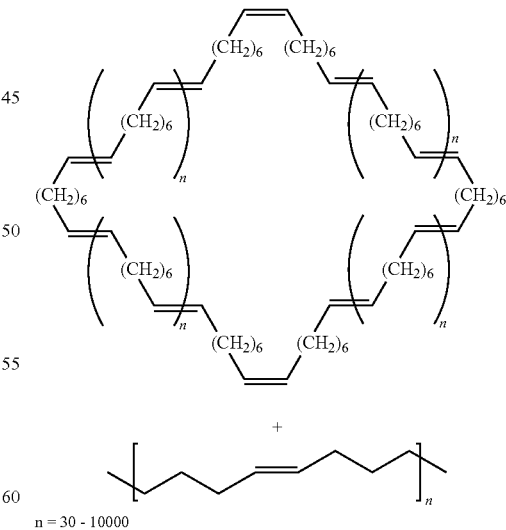

n = 30 - 10000

Suitable cyclic olefins that can be used to make the cycloalkene rubber include unsaturated hydrocarbons with 4 to 12 ring carbon atoms in one or more rings e.g., 1-3 rings, which exhibit in at least one ring an unsubstituted double bond which is not in conjugation to a second double bond which may be present and which may have any degree of substitution; the substituents must not interfere with the metathesis catalysts and are preferably alkyl groups of 1 to 4 carbon atoms or a part of a cyclic structure of 4 to 8 carbon atoms. Examples are cyclobutene, cyclopentene, cycloheptene, cis- and trans-cyclooctene, cyclononene, cyclodecene, cycloundecene, cis- and trans-cyclododecene, cis, cis-cyclooctadiene, 1-methyl-1,5-cyclooctadiene, 3-methyl-1,5-cyclooctadiene, and 3,7-dimethyl-1,5-cyclooctadiene.

Examples of suitable polyalkenamer rubbers are polypentenamer rubber, polyheptenamer rubber, polyoctenamer rubber, polydecenamer rubber and polydodecenamer rubber. Polyoctenamer rubbers are commercially available from Evonik Degussa GmbH of Marl, Germany and sold under the VESTENAMER tradename. The polyalkenamer rubber used in the present invention preferably has a trans-bond content of about 55% or greater and a second heat melting point of about 30° C. or greater. More preferably, the cycloalkene rubber has a trans-bond content of 75% or greater and a second heat melting point of 50° C. or greater. Furthermore, the polyalkenamer rubber material preferably has a molecular weight of about 80,000 or greater (measured according to GPC); a glass transition temperature (Tg) of about 55° C. or less (measured according to ISO 6721 or 4663); a cis-to-trans ratio of double bonds of about 40:60 or preferably about 20:80 (measured according to IR); a Mooney viscosity ML (1+4) 100° C. of less than about 10 (measured according to DIN 53 523 or ASTM-D 1646); a viscosity number J/23° C. of about 130 or preferably about 120 ml/g (measured according to ISO 1628-1); and a density of about 0.9 g/cm$^3$ or greater (measured according to DIN 53 479 A or ISO 1183).

The polyalkenamer rubber compound, of and by itself, has relatively high crystallinity. For example, a specific grade of polyalkenamer rubber (VESTENAMER 8012) has a crystallinity of approximately 30% (measured by DSC, second melting.) The ratio of cis double bonds to trans double bonds (cis/trans ratio) in the polymer is significant in determining the degree of crystallinity in the polymer. In general, if the trans-bond content of the polymer is relatively high, the crystallinity and melting point of the polymer are relatively high. That is, as the trans-bond content increases, the crystallinity of the polymer increases. The polyalkenamer rubber, VESTENAMER 8012 has a trans-bond content of about 80%.

One example of a commercially-available material that can be used in accordance with this invention is VESTENAMER 8012 (trans-bond content of about 80% and a melting point of about 54° C.). The material, VESTENAMER 6213 (trans-bond content of about 60% and a melting point of about 30°) also may be effective.

Preferably, the polyalkenamer rubber is used in an amount of at least about 0.5% by weight based on total weight of final thermoplastic ionomeric composition and is generally present in an amount of about 1% to about 50%, preferably about 3 to about 25%, and more preferably about 5% to about 15%. In one preferred version of the final ionomeric composition, the blend comprises about 90 wt. % ionomer and about 10 wt. % polyalkenamer rubber. In a second preferred version, the blend comprises about 80 wt. % ionomer and about 20 wt. % polyalkenamer rubber. In yet another preferred embodiment, the blend comprises about 75 wt. % ionomer and about 25 wt. % polyalkenamer rubber.

When neutralized to relatively high levels (for example, over 75%), the final ionomeric compositions of this invention show improved resiliency, reduced melt flow, and improved heat resistance making them useful as non-cover layers in a variety of golf ball constructions. More particularly, in one embodiment, the thermoplastic, ionomeric compositions may be used to form an intermediate core layer in a multi-layer core where both the center (innermost core layer) and outermost core layer comprise a thermosetting diene rubber composition. Improved heat resistance is important to this particular core construction, because the core includes a thermosetting rubber outer core layer that must be molded over the ionomeric intermediate core layer. When using a conventional ionomeric composition, which has relatively low heat resistance and relatively high melt flow properties, flow-out or leakage of the ionomeric layer into (and possibly through) the over-molded thermoset layer during compression molding at an elevated temperature and pressure is a problem. In the present invention, it has been found that the final ionomeric composition containing acid groups neutralized to 30 wt. % or greater, wherein the composition comprises a cycloalkene rubber has sufficient heat resistance and relatively low melt flow properties so that leakage of the ionomeric layer into the over-molded thermoset layer is not a significant problem.

Additional Materials

The final ionomeric composition of this invention may contain additional materials such as, for example, a small amount of ionic plasticizer, which is particularly effective at improving the processability of highly-neutralized ionomers. For example, the ionic plasticizer may be added in an amount of 0.5 to 10 pph, more preferably 1 to 5 pph. In addition to the fatty acids and salts of fatty acids discussed above, other suitable ionic plasticizers include, for example, polyethylene glycols, waxes, bis-stearamides, minerals, and phthalates. In another embodiment, an amine or pyridine compound is used, preferably in addition to a metal cation. Suitable examples include, for example, ethylamine, methylamine, diethylamine, tert-butylamine, dodecylamine, and the like.

Fillers, fibers, flakes also may be included in the final ionomeric composition. Particularly preferred additives of this nature include, but are not limited to, very-high-surface-area fillers that have an affinity for the acid groups in ionomer. In particular, fillers, fibers or flakes having cationic nature such that they may also contribute to the neutralization of the ionomer are suitable. Aluminum oxide comprising fillers are preferred. Also, silica, fumed silica, or precipitated silica, such as those sold under the tradename HISIL from PPG Industries, or carbon black. Nano-scale materials are also preferred and include, but are not limited to, nanotubes, nanoflakes, nanofillers, or nanoclays.

Other additives and fillers include, but are not limited to, chemical blowing and foaming agents, optical brighteners, coloring agents, fluorescent agents, whitening agents, UV absorbers, light stabilizers, defoaming agents, processing aids, antioxidants, stabilizers, softening agents, fragrance components, plasticizers, impact modifiers, $TiO_2$, acid copolymer wax, surfactants, and fillers, such as zinc oxide, tin oxide, barium sulfate, zinc sulfate, calcium oxide, calcium carbonate, zinc carbonate, barium carbonate, tungsten, tungsten carbide, silica, lead silicate, regrind (recycled material), clay, mica, talc, nano-fillers, carbon black, glass flake, milled glass, and mixtures thereof. Suitable additives are more fully described in, for example, Rajagopalan et al., U.S. Patent Application Publication No. 2003/0225197, the entire disclosure of which is hereby incorporated herein by reference. In a particular embodiment, the total amount of additive(s) and filler(s) present in the final thermoplastic ionomeric composition is 15 wt % or less, or 12 wt % or less, or 10 wt % or less, or 9 wt % or less, or 6 wt % or less, or 5 wt % or less, or 4 wt % or less, or 3 wt % or less, based on the total weight of the ionomeric composition. In a particular aspect of this embodiment, the final thermoplastic ionomeric composition includes filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. In a particular embodiment, the final thermoplastic ionomeric composition is modified with organic fiber micropulp, as disclosed, for example, in Chen, U.S. Pat. No. 7,504,448, the entire disclosure of which is hereby incorporated herein by reference.

In another embodiment, a peroxide or other source of free radicals is added to the polyalkenamer rubber and is allowed to react, and this material is used in the final ionomeric composition. For example, the peroxide may be added to an extruder or in an injection molding machine, just prior to the golf ball layer being molded. The peroxide is added at a relatively low activity level of about 0.01 to 5.00 phr, more preferably about 0.025 to 2.50 phr, and most preferably about 0.05 to 1.50 phr.

In still another embodiment, the polyalkenamer rubber may be blended with a reactive polymer, such as an epoxy resin or an epoxy-group functional polymer, such as glycidyl (meth)acrylate polymers disclosed in Kawamoto et al., U.S. Pat. No. 4,968,752 or Statz et al., U.S. Pat. No. 5,155,157 and Saltman, U.S. Pat. No. 5,091,478. Also suitable are epoxy-acid-tert amines as disclosed in Stevenson et al., U.S. Pat. No. 6,087,417. A FUSABOND-type polymer containing very high levels of maleic anhydride may also be suitable. Other examples include DuPont BEXLOY and REFLECTIONS polymers. In yet another version, a grafted polyalkenamer rubber may be used. The polyalkenamer rubber may be modified with an organic group that includes at least one carbon-carbon double bond and at least one functional group such as an anhydride, carboxyl, amino, halogen, ester, ether, isocyanate, or salt thereof as disclosed in Kim et al., U.S. Patent Application Publication No. 2010/0160079.

Other suitable thermoplastic polymers that may be included in the final ionomeric composition of this invention include, but are not limited to, the following polymers (including homopolymers, copolymers, and derivatives thereof.) These materials generally have good inherent thermal stability (that is, they melt at a high enough temperature.)

(a) polyesters, particularly those modified with a compatibilizing group such as sulfonate or phosphonate, including modified poly(ethylene terephthalate), modified poly(butylene terephthalate), modified polypropylene terephthalate), modified poly(trimethylene terephthalate), modified poly(ethylene naphthenate), and those disclosed in U.S. Pat. Nos. 6,353,050, 6,274,298, and 6,001,930, the entire disclosures of which are hereby incorporated herein by reference, and blends of two or more thereof;

(b) polyamides, polyamide-ethers, and polyamide-esters, and those disclosed in U.S. Pat. Nos. 6,187,864, 6,001,930, and 5,981,654, the entire disclosures of which are hereby incorporated herein by reference, and blends of two or more thereof;

(c) polyurethanes, polyureas, polyurethane-polyurea hybrids, and blends of two or more thereof;

(d) fluoropolymers, such as those disclosed in U.S. Pat. Nos. 5,691,066, 6,747,110 and 7,009,002, the entire disclosures of which are hereby incorporated herein by reference, and blends of two or more thereof;

(e) polystyrenes, such as poly(styrene-co-maleic anhydride), acrylonitrile-butadiene-styrene, poly(styrene sulfonate), polyethylene styrene, and blends of two or more thereof;

(f) polyvinyl chlorides and grafted polyvinyl chlorides, and blends of two or more thereof;

(g) polycarbonates, blends of polycarbonate/acrylonitrile-butadiene-styrene, blends of polycarbonate/polyurethane, blends of polycarbonate/polyester, and blends of two or more thereof;

(h) polyethers, such as polyarylene ethers, polyphenylene oxides, block copolymers of alkenyl aromatics with vinyl aromatics and polyamicesters, and blends of two or more thereof;

(i) polyimides, polyetherketones, polyamideimides, and blends of two or more thereof; and (j) polycarbonate/polyester copolymers and blends.

Furthermore, the resulting thermoplastic ionomer composition may contain other natural and synthetic rubbers, in addition to the polyalkenamer rubber, such as, for example, polybutadiene, polyisoprene, ethylene propylene rubber, ethylene propylene diene rubber, and styrene-butadiene rubber.

In a particular embodiment, the resulting thermoplastic ionomeric composition may contain a blend of two or more ionomers. For example, the composition may contain a 50/50 wt % blend of two different highly-neutralized ethylene/methacrylic acid copolymers. In another version, the composition may contain a blend of one or more ionomers and a maleic anhydride-grafted non-ionomeric polymer. The non-ionomeric polymer may be a metallocene-catalyzed polymer. In another version, the composition contains a blend of a highly-neutralized ethylene/methacrylic acid copolymer and a maleic anhydride-grafted metallocene-catalyzed polyethylene. In yet another version, the composition contains a material selected from the group consisting of highly-neutralized ionomers optionally blended with a maleic anhydride-grafted non-ionomeric polymer; polyester elastomers; polyamide elastomers; and combinations of two or more thereof.

The thermoplastic ionomeric compositions of this invention generally have low flow and/or improved heat resistance and may be used to form any core, intermediate, and/or cover layer. The thermoplastic ionomeric composition may be optionally treated or admixed with a thermoset diene composition to reduce or prevent melt flow even further. Optional treatments may also include the addition of peroxide to the material prior to molding, or a post-molding treatment with, for example, a cross-linking solution, electron beam, gamma radiation, isocyanate or amine solution treatment, or the like.

The low flow compositions are particularly effective, where a layer is molded over the composition in a manner that would otherwise cause conventional materials to flow or flow-through that layer upon heating. For example, the low flow composition may be used in a center, intermediate, or outer core layer, or in a cover layer of a multilayer golf ball, wherein the low flow composition is over-molded with a material that requires processing at such a temperature at or above the flow or melt temperature of the substrate layer.

Cover Materials

As discussed above, the thermoplastic ionomeric composition of this invention may be used to form a cover for the golf ball. The cover may be single or multi-layered. In one embodiment, as described further below, the golf includes a multi-layered cover comprising inner and outer cover layers. The thermoplastic ionomeric composition is particularly suitable for forming an inner cover for the ball providing some hardness and durability to the ball. In cases where the thermoplastic ionomeric composition is not used to form a cover layer, conventional cover material may be used.

For example, a high acid ionomer such as Surlyn 8150®, commercially available from DuPont, may be used. Surlyn 8150® is a copolymer of ethylene and methacrylic acid, having an acid content of 19 wt %, which is 45% neutralized with sodium. In another embodiment, the inner cover layer is formed from a composition comprising a high acid ionomer and a maleic anhydride-grafted non-ionomeric polymer. A particularly suitable maleic anhydride-grafted polymer is Fusabond 525D®, commercially available from DuPont. Fusabond 525D® is a maleic anhydride-grafted, metallocene-catalyzed ethylene-butene copolymer having about 0.9 wt % maleic anhydride grafted onto the copolymer. A particularly preferred blend of high acid ionomer and maleic anhydride-grafted polymer is a 84 wt %/16 wt % blend of Surlyn 8150® and Fusabond 525D®. Blends of high acid ionomers with maleic anhydride-grafted polymers are further disclosed, for example, in Boehm et al., U.S. Pat. Nos. 6,992,135 and 6,677,401, the disclosures of which are hereby incorporated herein by reference.

In another version, the inner cover layer is preferably formed from a composition comprising a 50/45/5 blend of Surlyn® 8940/Surlyn® 9650/Nucrel® 960, and, in a preferred embodiment, has a material hardness of from 80 to 85 Shore C. In another instance, the inner cover layer is preferably formed from a composition comprising a 50/25/25 blend of Surlyn® 8940/Surlyn® 9650/Surlyn® 9910, preferably having a material hardness of about 90 Shore C. In yet another version, the inner cover layer is preferably formed from a composition comprising a 50/50 blend of Surlyn® 8940/Surlyn® 9650, preferably having a material hardness of about 86 Shore C. Surlyn® 8940 is an E/MAA copolymer in which the MAA acid groups have been partially neutralized with sodium ions. Surlyn® 9650 and Surlyn® 9910 are two different grades of E/MAA copolymer in which the MAA acid groups have been partially neutralized with zinc ions. Nucrel® 960 is an E/MAA copolymer resin nominally made with 15 wt % methacrylic acid. Surlyn® 8940, Surlyn® 9650, Surlyn® 9910, and Nucrel® 960 are commercially available from DuPont. Intermediate layers can be produced by molding processes known in the golf ball art. Specifically, the golf balls can be produced by compression or injection molding the intermediate layer about cores to produce an intermediate golf ball (sub-assembly). Subsequently, the outer cover layer may be molded about the golf ball sub-assembly.

The thermoplastic ionomeric composition of this invention may be used to form the outer cover of the ball. In cases where the thermoplastic ionomeric composition is not used to form the outer cover layer, conventional outer cover materials may be used. Suitable materials for forming the outer cover layer include, for example, polyurethanes; polyureas; copolymers, blends, and hybrids of polyurethane and polyurea; olefin-based copolymer ionomer resins (for example, Surlyn® ionomer resins and DuPont HPF® 1000 and HPF® 2000; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.; polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof polyester-based thermoplastic elastomers, such as Hytrel®, commercially available from DuPont; polyurethane-based thermoplastic elastomers, such as Elastollan®, commercially available from BASF; synthetic or natural vulcanized rubber; and combinations thereof. Castable polyurethanes, polyureas, and copolymers, hybrids, and mixtures of polyurethanes-polyureas are of particular interest, because these materials can be used to make a golf ball having high resiliency and soft feel. By the term, "hybrids of polyurethane and polyurea," it is meant to include copolymers and blends thereof.

Polyurethanes, polyureas, and blends, copolymers, and hybrids of polyurethane/polyurea are also particularly suitable for forming cover layers. When used as cover layer materials, polyurethanes and polyureas can be thermoset or thermoplastic. Thermoset materials can be formed into golf ball layers by conventional casting or reaction injection molding techniques. Thermoplastic materials can be foamed into golf ball layers by conventional compression or injection molding techniques.

Golf Ball Construction

Figure 2:
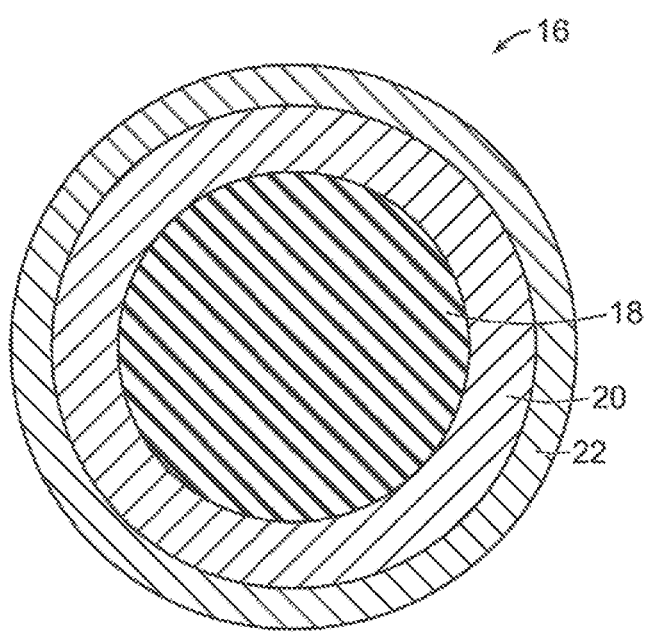
FIG. 2 is a cross-sectional view of a three-piece golf ball having a dual-core comprising an inner core and outer core made of polyalkenamer rubber/ionomer composition and a cover layer made in accordance with the present invention.
Figure 3:
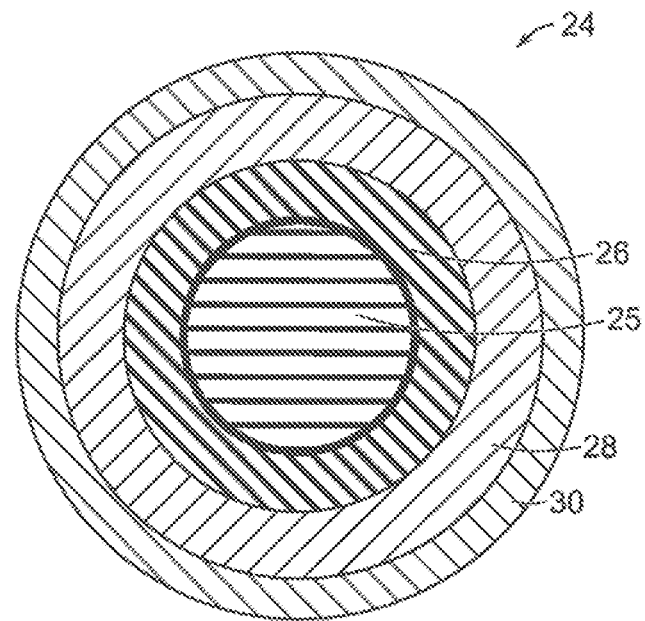
FIG. 3 is a cross-sectional view of a four-piece golf ball having a dual-core comprising an inner core and outer core; an inner cover layer made of polyalkenamer rubber/ionomer composition; and an outer cover layer made in accordance with the present invention.
Figure 4:
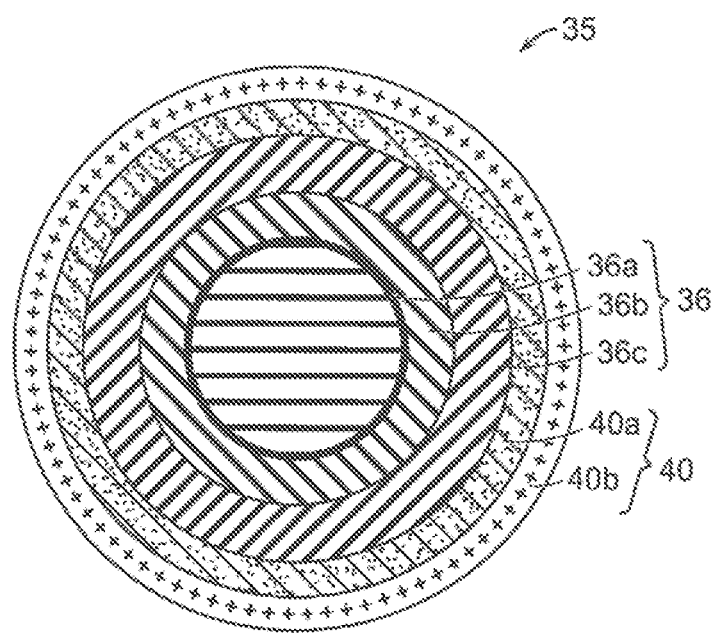
FIG. 4 is a cross-sectional view of a five-piece golf ball having a dual-core comprising an inner core and outer core; an intermediate layer; an inner cover layer made of polyalkenamer rubber/ionomer composition; and an outer cover layer made in accordance with the present invention.

As discussed above, the thermoplastic ionomeric compositions of this invention may be used with any type of ball construction known in the art. Such golf ball designs include, for example, two-piece, three-piece, four-piece, and five-piece designs. Referring to FIG. 1, one version of a golf ball that can be made in accordance with this invention is generally indicated at (10). In this two-piece golf ball (10), the ball includes a solid, single-layered core (12) made of the polyalkenamer rubber/ionomer composition and a cover layer (14) made of polyurethane. In FIG. 2, a three-piece ball (16) comprising a dual-core (18) having an inner core (18a) and outer core layer (18b) along with a cover (19) is shown. In this version, the outer core layer (18b) is made of the polyalkenamer rubber/ionomer composition. In another embodiment, as shown in FIG. 3, the four-piece golf ball (20) contains a dual-core (22) comprising an inner core (22a) and outer core layer (22b). The golf ball (20) further includes a multi-layer cover (26) comprising inner cover (26a) and outer cover (26b) layers. In this version, the polyalkenamer rubber/ionomer composition is used to form the inner cover (26a). Turning to FIG. 4 in yet another version, a five-piece golf ball (30) containing a dual-core (32) comprising an inner core (32a) and outer core layer (32b) can be made. This ball includes an intermediate layer (34) and a multi-layered cover (36) comprising an inner cover layer (36a) made of the polyalkenamer rubber/ionomer composition, and outer cover layer (36b). It should be understood the golf balls shown in FIGS. 1-4 are for illustrative purposes only and are not meant to be restrictive. It should be recognized that other golf ball constructions can be made in accordance with this invention.

In one embodiment, the golf ball has a solid, single-core; an intermediate layer; and a cover layer. When a single-layered core is used, the core preferably has a diameter within a range having a lower limit of 1.40 or 1.45 or 1.50 or 1.51 or 1.53 inches and an upper limit of 1.55 or 1.59 or 1.60 or 1.62 or 1.66 inches, and more preferably has a diameter within a range having a lower limit of 1.51 or 1.53 inches and an upper range of 1.55 or 1.59 inches. In a particularly preferred embodiment, the core has a diameter of about 1.53 inches.

In another embodiment, the golf ball has a dual-core (that is, a two-layered core) and a dual (two-layered) cover enclosing the core. In yet another version, a five-piece golf ball may be made having a dual core, and intermediate layer, and a dual cover. The dual-core constitutes an inner core (center) and an outer core layer. The inner core has a diameter within a range having a lower limit of 0.75 or 0.85 or 0.875 inches and an upper limit of 1.125 or 1.15 or 1.39 inches. The outer core layer encloses the inner core such that the two-layer core has an overall diameter within a range having a lower limit of 1.40 or 1.50 or 1.51 or 1.52 or 1.525 inches and an upper limit of 1.54 or 1.55 or 1.555 or 1.56 or 1.59 inches.

When a single-layered core is used, the core preferably has a center hardness within a range having a lower limit of 30 or 40 or 45 Shore C and an upper limit of 70 or 75 or 80 Shore C. The surface hardness of the core is preferably greater than 70 Shore C, or 75 Shore C or greater, 80 Shore C or greater, 85 Shore C or greater, or 90 Shore C or greater. In a particular embodiment, the surface hardness of the core is greater than the center hardness of the core to define a positive hardness gradient and more preferably the surface hardness of the core is at least 10 Shore C units greater than the center hardness of the core.

When a dual-layered core is used, the inner core (center) preferably has a geometric center hardness within a range having a lower limit of 50 or 55 or 60 Shore C and an upper limit of 65 or 70 or 80 Shore C. Meanwhile, the outer core layer preferably has an outer surface hardness of 75 Shore C or greater, or 80 Shore C or greater, or 85 Shore C or greater, or 90 Shore C or greater. And, the inner surface of the outer core preferably has a surface hardness within a range having a lower limit of 55, 60, 65, 70, or 75 Shore C and an upper limit of 80, 85, or 90 Shore C.

The intermediate (or inner cover) layer preferably has a material hardness within a range having a lower limit of 70 or 75 or 80 or 82 Shore C and an upper limit of 85 or 86 or 90 or 92 Shore C. The thickness of the intermediate layer is preferably within a range having a lower limit of 0.010 or 0.015 or 0.020 or 0.030 inches and an upper limit of 0.035 or 0.045 or 0.080 or 0.120 inches. The outer cover layer preferably has a material hardness of 85 Shore C or less. The thickness of the outer cover layer is preferably within a range having a lower limit of 0.010 or 0.015 or 0.025 inches and an upper limit of 0.035 or 0.040 or 0.055 or 0.080 inches. Methods for measuring hardness of the layers in the golf ball are described in further detail below.

As discussed above, the single-layered core of this invention may be enclosed with one or more cover layers. The inner cover layer(s) may be referred to as intermediate layers. In one embodiment, a multi-layered cover comprising inner and outer cover layers is formed, where the inner cover layer has a thickness of about 0.01 inches to about 0.06 inches, more preferably about 0.015 inches to about 0.040 inches, and most preferably about 0.02 inches to about 0.035 inches. In this version, the inner cover layer is formed from a partially- or fully-neutralized ionomer having a Shore D hardness of greater than about 55, more preferably greater than about 60, and most preferably greater than about 65. The outer cover layer, in this embodiment, preferably has a thickness of about 0.015 inches to about 0.055 inches, more preferably about 0.02 inches to about 0.04 inches, and most preferably about 0.025 inches to about 0.035 inches, with a hardness of about Shore D 80 or less, more preferably 70 or less, and most preferably about 60 or less. The inner cover layer is harder than the outer cover layer in this version. A preferred outer cover layer is a castable or reaction injection molded polyurethane, polyurea or copolymer, blend, or hybrid thereof having a Shore D hardness of about 40 to about 50. In another multi-layer cover, single core embodiment, the outer cover and inner cover layer materials and thickness are the same but, the hardness range is reversed, that is, the outer cover layer is harder than the inner cover layer.

In one preferred embodiment, a three-layered core is prepared. The multi-layer core includes a thermosetting rubber center or innermost core layer comprising a first diene rubber composition, a thermoplastic intermediate core layer comprising the thermoplastic ionomeric composition described above, and a thermosetting rubber outer core layer comprising a second diene rubber composition. The center preferably has an overall diameter of 1.25 inches or greater, or 1.35 inches or greater, or 1.390 inches or greater, or 1.45 inches or greater, or an overall diameter within a range having a lower limit of 0.25 or 0.50 or 0.75 or 1.00 or 1.25 or 1.35 or 1.39 or 1.40 or 1.44 inches and an upper limit of 1.46 or 1.49 or 1.50 or 1.55 or 1.58 or 1.60 inches. The intermediate core layer preferably has a thickness within a range having a lower limit of 0.005 or 0.01 or 0.02 or 0.04 inches and an upper limit of 0.05 or 0.06 or 0.07 or 0.08 or 0.09 or 0.10 inches. In one embodiment, the surface hardness of the intermediate layer is greater than the surface hardness of both the center and the outer core layer. The outer core layer preferably has a thickness within a range having a lower limit of 0.01 or 0.02 or 0.025 or 0.03 or 0.035 inches and an upper limit of 0.04 or 0.07 or 0.075 or 0.08 or 0.10 or 0.16 inches. In a particular embodiment, the outer core layer has a thickness of 0.035 inches or 0.04 inches or 0.045 inches or 0.05 inches or 0.055 inches or 0.06 inches or 0.065 inches. In a particular aspect of this embodiment, the surface hardness of the outer core layer is greater than the surface hardness of the center.

In one particular construction, a multi-piece golf ball, comprising: a) a core comprising an inner core and outer core layer, wherein the outer core layer is disposed about the inner core, the core having an overall diameter of about 1.40 to about 1.60 inches; and b) a cover having a thickness of about 0.015 to about 0.090 inches and surface hardness of about 20 to about 70 Shore D is formed. At least one one of the inner core, outer core layer, or cover is formed from a thermoplastic ionomeric composition containing acid groups neutralized to 30 wt. % or greater. The ionomeric composition comprises: i) cycloalkene rubber; ii) ionomeric resin; and iii) neutralizing agent. The ionomeric composition is prepared by providing a masterbatch comprising the cycloalkene rubber and neutralizing agent and mixing the masterbatch with ethylene acid copolymer.

Preferably, the cover comprises an inner cover layer and outer cover layer, wherein the inner cover has a thickness of about 0.020 to about 0.120 inches and a surface hardness of about 60 Shore D or greater; and the outer cover has a thickness of about 0.010 to about 0.080 inches and a surface hardness of about 20 to about 70 Shore D. The golf ball may further include an intermediate layer having a thickness of about 0.015 inches to about 0.120 inches and surface hardness of about 45 to about 75 Shore D.

In another particular construction, a golf ball containing a three-layered core is made. The golf ball includes: a) an inner core layer comprising a first diene rubber composition and having a diameter of about 1.25 inches to about 1.58 inches; b) an outer core layer comprising a second diene rubber composition and having a thickness of about 0.01 inches to about 0.16 inches; and c) an intermediate core layer having a thickness of about 0.005 inches to about 0.100 inches disposed between the inner core layer and the outer core layer. At least one of the core layers comprises a thermoplastic ionomeric composition containing acid groups neutralized to 30 wt. % or greater. The ionomeric composition contains: i) cycloalkene rubber; ii) ionomeric resin; and iii) neutralizing agent. A masterbatch comprising the cycloalkene rubber and neutralizing agent is prepared and mixed with ethylene acid copolymer to make the composition.

In accordance with the present invention, it has been found that polyalkenamer rubbers can be used as carriers for introducing neutralizing agents into the ethylene acid copolymer material. By first preparing a masterbatch comprising the polyalkenamer rubber and neutralizing agent, the addition of the neutralizing agent into the ethylene acid copolymer material can be performed with greater control. Per this method, the addition of neutralizing agent can be done more neatly and safely. There is no reactivity between the polyalkenamer and neutralizing agents. Thus, the neutralizing agent is more uniformly dispersed in the polyalkenamer masterbatch. Later, when the masterbatch is mixed with the ethylene acid copolymer, the neutralizing agents are more like to be uniformly distributed and can more effectively neutralize the acid groups, thus forming a more homogeneous material. Moreover, the polyalkenamer rubber can impart advantageous properties to the ionomeric composition so that it can be used to form a component of the golf ball. For example, as discussed above, the polyalkenamer rubber can be used to provide a composition that can be formed into a core layer having good compression and resiliency. The thermoplastic ionomeric compositions of this invention may be used to form any core, intermediate, and/or cover layer.

Test Methods

Hardness. The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball subassembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conform to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

Also, it should be understood that there is a fundamental difference between "material hardness" and "hardness as measured directly on a golf ball." For purposes of the present invention, material hardness is measured according to ASTM D-2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or D hardness) was measured according to the test method ASTM D-2240.

Compression. As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, "compression" refers to Atti compression and is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero compression measurement. The Atti compression tester is designed to measure objects having a diameter of 42.7 mm (1.68 inches); thus, smaller objects, such as golf ball cores, must be shimmed to a total height of 42.7 mm to obtain an accurate reading. Conversion from Atti compression to Riehle (cores), Riehle (balls), 100 kg deflection, 130-10 kg deflection or effective modulus can be carried out according to the formulas given in J. Dalton. Compression may be measured as described in McNamara et al., U.S. Pat. No. 7,777,871, the disclosure of which is hereby incorporated by reference.

Coefficient of Restitution ("COR"). The COR is determined according to a known procedure, wherein a golf ball or golf ball subassembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period (COR=$V_{out}/V_{in}=T_{in}/T_{out}$).

When numerical lower limits and numerical upper limits are set forth herein, it is contemplated that any combination of these values may be used. Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention.

All patents, publications, test procedures, and other references cited herein, including priority documents, are fully incorporated by reference to the extent such disclosure is not inconsistent with this invention and for all jurisdictions in which such incorporation is permitted.

It is understood that the compositions and golf ball products described and illustrated herein represent only some embodiments of the invention. It is appreciated by those skilled in the art that various changes and additions can be made to compositions and products without departing from the spirit and scope of this invention. It is intended that all such embodiments be covered by the appended claims.

We claim:

1. A multi-piece golf ball, comprising a solid three-layered core and cover of at least one layer, wherein the core includes a center comprising a first diene rubber composition; an intermediate core layer; and an outer core layer comprising a second diene rubber composition, wherein the intermediate core layer is formed from a thermoplastic ionomeric composition containing acid groups neutralized to 30 wt. % or greater, the ionomeric composition comprising: i) cycloalkene rubber; ii) ionomeric resin; and iii) neutralizing agent, wherein the composition is prepared by providing a masterbatch comprising the cycloalkene rubber and neutralizing agent and mixing the masterbatch with ethylene acid copolymer.

2. The multi-piece golf ball of claim 1, wherein the cycloalkene rubber has a trans-content of about 55% or greater and a melting point of 30° C. or greater.

3. The golf ball of claim 1, wherein the cycloalkene rubber has a trans-content of 75% or greater and a melting point of 50° C. or greater.

4. The golf ball of claim 1, wherein the ionomeric composition further comprises peroxide in an amount of 2.5 phr or greater based on weight of cycloalkene rubber.

5. The golf ball of claim 1, wherein the ionomeric composition contains acid groups neutralized to 70 wt. % or greater.

6. The golf ball of claim 5, wherein the ionomeric composition contains acid groups neutralized to 90 wt % or greater.

7. The golf ball of claim 1, wherein the masterbatch comprises at least 25% by weight neutralizing agents.

8. The golf ball of claim 7, wherein the masterbatch comprises at least 50% by weight neutralizing agents.

9. The golf ball of claim 1, wherein the neutralizing agent is a metal cation salt.

10. The golf ball of claim 9, wherein the metal cation is selected from the group consisting of Zn, Na, Li, K, Ca, Mg, Ni, Mn, Cu, Ti, and Al, and mixtures thereof.

11. The golf ball of claim 1, wherein the ionomeric composition further comprises a fatty acid or salt thereof.

12. The golf ball of claim 11, wherein the fatty acid or salt thereof is added to the masterbatch prior to mixing the masterbatch with the ethylene acid copolymer.

13. The golf hail of claim 11, wherein the fatty acid is selected from the group consisting of stearic acid, behenic acid, erucic acid, oleic acid, linoelic acid, and dimerized derivatives, and mixtures thereof.

14. The golf ball of claim 1, wherein the neutralizing agent is selected from the group consisting of amine-based and pyridine-based compounds, and mixtures thereof.

15. A multi-piece golf ball, comprising a solid three-layered core and cover of at least one layer, wherein the core includes a center comprising a first diene rubber composition; an intermediate core layer; and an outer core layer comprising a second diene rubber composition, wherein the intermediate core layer is formed from a thermoplastic ionomeric composition containing acid groups neutralized to 30 wt. % or greater, the ionomeric composition comprising: i) cycloalkene rubber; ii) ionomeric resin; and iii) neutralizing agent, wherein the composition is prepared by providing a masterbatch comprising the cycloalkene rubber and neutralizing agent and mixing the masterbatch with a partially neutralized ethylene acid copolymer.

16. The multi-piece golf ball of claim 15, wherein the partially neutralized ethylene acid copolymer contains acid groups neutralized to 10% or greater, whereby the final ionomeric composition contains acid groups neutralized to 40% or greater.

17. The multi-piece golf ball of claim 15, wherein the partially neutralized ethylene acid copolymer contains acid groups neutralized to 30% or greater, whereby the final ionomeric composition contains acid groups neutralized to 60% or greater.

* * * * *